A. R. LANGLEY.
TROLLEY WIRE FINDING AND REPLACING DEVICE.
APPLICATION FILED DEC. 2, 1916.
1,312,697.
Patented Aug. 12, 1919.
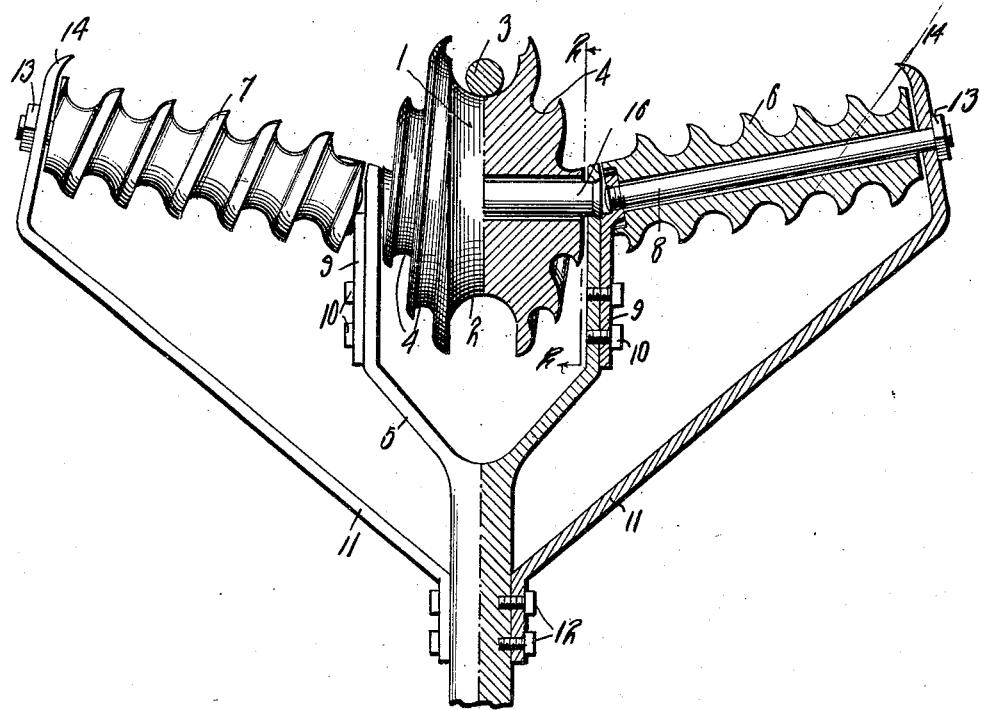
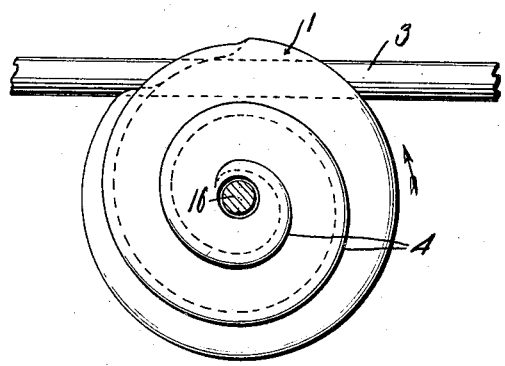
WITNESSES
INVENTOR
Arthur R. Langley
BY
ATTORNEY

UNITED STATES PATENT OFFICE.

ARTHUR R. LANGLEY, OF OAKLAND, CALIFORNIA.

TROLLEY-WIRE FINDING AND REPLACING DEVICE.

1,312,697.  Specification of Letters Patent.  Patented Aug. 12, 1919.

Application filed December 2, 1916. Serial No. 134,657.

*To all whom it may concern:*

Be it known that I, ARTHUR R. LANGLEY, a subject of the King of Great Britain, residing at Oakland, in the county of Alameda and State of California, have invented certain new and useful Improvements in Trolley-Wire Finding and Replacing Devices, of which the following is a specification.

The present invention relates to trolley wheels and is more particularly concerned with means for replacing the trolley wire in the event of its displacement from the trolley wheel by the irregularities in the wire.

The main object of the invention is the production of a trolley wheel of such a construction that the trolley wire will be guided or conveyed automatically into engagement with the usual grooved periphery of the wheel, when the trolley wire has become displaced from said groove.

A further object of the invention is the production of a trolley wheel as above mentioned and the provision of other wire finding and conveying means for attachment to the trolley pole or harp for coöperating association with the trolley wheel so as to facilitate the replacing of the trolley wire.

A still further object of the invention is the production of the means above mentioned which will operate effectively and which may be readily adapted to trolley poles now in use.

The invention resides in the provision of a trolley wheel having its side faces formed with helical grooves which commence at a point adjacent the axis of the wheel and finally merge into the grooved periphery of the wheel. A further feature of the invention resides in the provision of spirally grooved rollers which are disposed on opposite sides of the trolley wheel to assist in the finding of the trolley wire and to finally convey it to the innermost convolutions of the helical grooves on the sides of the trolley wheel. The invention further resides in the novel features of construction which will be hereinafter more fully described and finally pointed out in the claim.

In the drawings which are to be read in connection with the specification:

Figure 1 is a front view of the invention partly in elevation and partly in section so as to clearly illustrate the detailed construction thereof, and Fig. 2 is a view illustrating the trolley wheel and taken on line 2—2 of Fig. 1.

Like characters denote similar and like parts throughout the specification and drawings.

Referring particularly to the drawings the invention is illustrated as applied to the trolley harp and 1 indicates a trolley wheel having the usual annular peripheral groove 2 in which engages the trolley wire 3. Each of the sides of the trolley wheel has a groove 4 therein arranged in substantially a helicoidal manner, as clearly shown in Figs. 1 and 2. The innermost end of the groove commences at a point adjacent the axis of the wheel while the outer end of the groove merges into the peripheral groove 2 of the trolley wheel. These grooves are so arranged on opposite sides of the wheel 1 as to convey or lift the trolley wire into the groove when the wheel is rotated in one direction and when the trolley wire is in engagement therewith. It will be understood that should the trolley wire become accidentally displaced from the groove 2 of the trolley wheel the wire 3 will engage in either of the grooves 4 on opposite sides of the wheel and be automatically replaced in the usual peripheral groove 2 of the trolley wheel. A trolley wheel thus constructed will also permit the trolley harp and its parts to be easily and quickly manually adjusted in position and in engagement with the trolley wire without necessitating an accurate centering of the trolley wheel relative to the trolley wire 3. It will be obvious that only an approximate centering is necessary and thereby facilitates the placing of the trolley wheel into engagement with the trolley wire.

The trolley wheel 1 may be mounted in the trolley harp 5 in any approved manner, however in the present instance it is shown as having an axial bore through which extends the axle or shaft 16 having its ends secured in the arms of the trolley harp 5.

The invention further contemplates the use of collecting rollers which are to be arranged on opposite sides of the trolley wheel to assist in the finding and replacing of the trolley wire. It is to be understood however that the trolley wheel above described may be used without the association of the additional collecting or finding rollers.

These collecting rollers are positioned to extend laterally or substantially axially of the trolley wheel and consist of the rollers 6 and 7 having their peripheral surface formed with right and left hand spiral grooves, respectively, and are rotatably mounted upon the shafts 8. The inner ends of the shafts 8 are threaded for engagement with the bracket plates 9 which plates are adapted to be secured to the harp 5 by suitable fastening means such as the bolts 10. The outer ends of the shafts 8 extend through the angular brackets 11, which brackets are adapted to be secured to the trolley pole or harp by suitable fastenings, such as the bolts 12. A nut 13 or the like is threaded on the outer extremity of the shafts 8 to hold them more securely in position. The upper extremities of the brackets 11 are extended upwardly and inwardly as shown at 14 for purposes which will be well understood.

It will be obvious from the foregoing, and especially with the use of the collecting or finding rollers 6 and 7, that when the trolley wire leaves the trolley wheel it will engage in either the grooves 4 of the trolley wheel or the spiral grooves of the rollers 6 and 7 and will be conveyed by said grooves, as the wheel and rollers rotate, into the annular peripheral groove of the trolley wheel. It will be seen that the rollers 6 and 7 are so arranged as to convey and discharge the trolley wire to the grooves 4 of the trolley wheel at a point adjacent the innermost end of the groove.

It is to be understood that the trolley wheel 1 may be used without the rollers 6 and 7 and that the latter may be applied to any trolley harp now used.

The foregoing clearly describes my invention, however it is to be understood that certain changes in the construction and arrangement of parts may be resorted to as falls within the legitimate scope of the appended claim.

What I claim is:—

In a trolley wire finder, the combination with a harp having a trolley wheel rotatably mounted therein, of a plate detachably connected to each side of the harp, the upper end of the plate being offset so as to leave a space between the upper end of the plate and side of the harp, a bracket detachably connected to each side of the harp, the upper end of each bracket being above the upper end of the plate, an inclined shaft carried by the plate and bracket on each side of the harp, and spirally grooved rollers rotatably mounted on the shafts, one end of each roller being provided with a recess to receive the offset on the plate and that end of the roller extending over the top of the plate and in close proximity to the upper end of the harp.

In testimony whereof I affix my signature in presence of two witnesses.

ARTHUR R. LANGLEY.

Witnesses:
CHAS. RING,
PAUL N. SPOFFORD.

Copies of this patent may be obtained for five cents each, by addressing the "Commissioner of Patents, Washington, D. C."